US008776453B1

(12) United States Patent
Fain

(10) Patent No.: US 8,776,453 B1
(45) Date of Patent: Jul. 15, 2014

(54) EASY-TO-BUILD MODULAR STEEL STORM SHELTER

(76) Inventor: Phil Fain, Jackson, TN (US)

(*) Notice: Subject to any disclaimer, the term of this patent is extended or adjusted under 35 U.S.C. 154(b) by 0 days.

(21) Appl. No.: 13/487,142

(22) Filed: Jun. 1, 2012

(51) Int. Cl.
*E04H 9/14* (2006.01)
(52) U.S. Cl.
CPC ........................................ *E04H 9/14* (2013.01)
USPC .......................... 52/169.6; 52/79.12; 109/1 S
(58) Field of Classification Search
USPC ........ 52/169.6, 79.12, 79.13, 79.9, 79.1, 106; 109/1 S, 1 V, 58, 64, 65, 78–85
See application file for complete search history.

(56) References Cited

U.S. PATENT DOCUMENTS

| | | | | |
|---|---|---|---|---|
| 6,016,634 A * | 1/2000 | Sayer | | 52/648.1 |
| 6,415,557 B1 * | 7/2002 | McCalley | | 52/79.1 |
| 6,415,558 B1 * | 7/2002 | Cherry | | 52/79.1 |
| 7,458,305 B1 * | 12/2008 | Horlander et al. | | 89/36.01 |
| 7,658,038 B2 * | 2/2010 | Mower et al. | | 52/79.1 |
| 2010/0293869 A1 * | 11/2010 | King et al. | | 52/79.9 |

* cited by examiner

*Primary Examiner* — William Gilbert
*Assistant Examiner* — Kyle Walraed-Sullivan
(74) *Attorney, Agent, or Firm* — Wyatt, Tarrant & Combs, LLP; William S. Parks

(57) ABSTRACT

A storm shelter that is configured specifically to facilitate erecting while also providing highly effective protection from high winds and other environmental phenomena is provided. In essence, the storm shelter includes the same exact size and shape panels, except for a single panel to allow for door placement, that permit expansion of shelter size in accordance with the builder's choice. Such panels are attachable to individual angle connectors to permit the initial creation of three-membered, U-shaped panel composites. Each composite may then be connected with another composite until the proper length of the building shell is provided. End panels are then attached with a door configuration on one end as well to complete the structure. Upon attachment to a solid surface, the user thus has an easily erected protective storm shelter. Utilization of proper gauge steel and a properly reinforced steel door, the shelter exceeds 250 MPH wind protection levels.

11 Claims, 12 Drawing Sheets

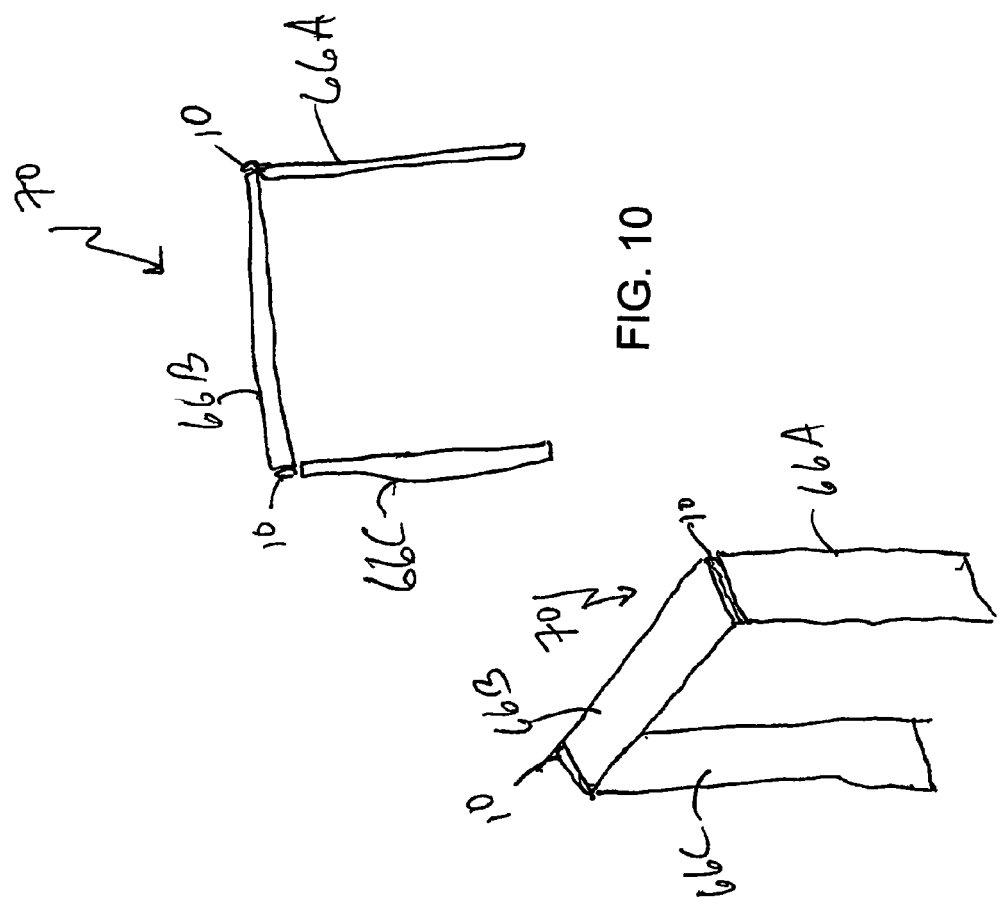

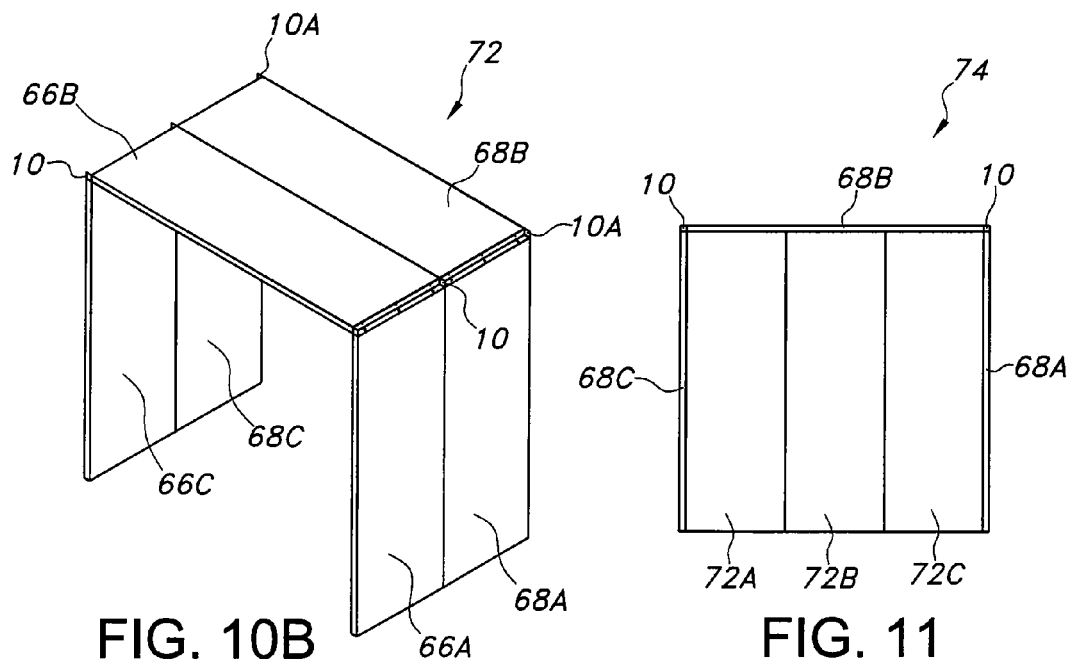
FIG. 10B
FIG. 11
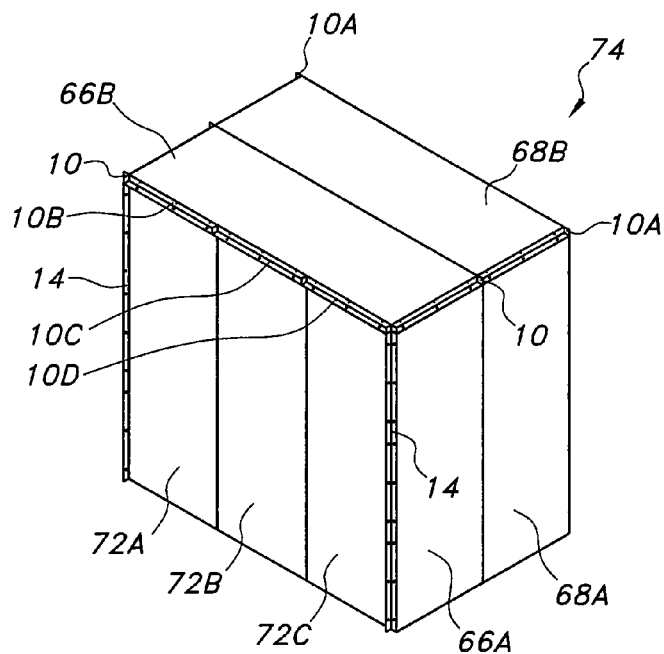
FIG. 11A

EASY-TO-BUILD MODULAR STEEL STORM SHELTER

FIELD OF THE INVENTION

The present invention relates to a storm shelter that is configured specifically to facilitate erecting while also providing highly effective protection from high winds and other environmental phenomena. In essence, the storm shelter includes the same exact size and shape panels, except for a single panel to allow for door placement, that permit expansion of shelter size in accordance with the builder's choice. Such panels are attachable to individual angle connectors to permit the initial creation of three-membered, U-shaped panel composites. Each composite may then be connected with another composite until the proper length of the building shell is provided. End panels are then attached with a door configuration on one end as well to complete the structure. Upon attachment to a solid surface, the user thus has an easily erected protective storm shelter. With the proper gauge steel utilized, as well as a properly reinforced steel door, the shelter provides effective protection for winds that exceed 250 MPH speeds. The method of erecting such a storm shelter is also encompassed within this invention.

BACKGROUND OF THE INVENTION

Severe weather has always proven to be unpredictable and, at times, incredibly destructive. A homeowner generally does not have a protective shelter to shield his or her family from such damaging events. Whether it be a tornado, hurricane, or even simply high velocity windstorms, many homes are not built to withstand such powerful natural forces. Tragic occurrences of cyclonic activity have even recently caused hundreds of millions of dollars on widespread destruction in certain areas of the United States, not to mention problems prevalent with monsoons and typhoons in other areas of the globe. Particularly hard hit are houses and other like structures that are typically formed of wooden frames and are built to withstand much lower wind velocities and other natural forces.

Additionally, though, the potential loss of life with such high wind speed events has taken its toll. Building collapse certainly contributes to such tragic results; however, the more likely issue that causes death during such events is the haphazard and high velocity movement of various materials and debris. At 200 miles per hour (MPH), even a simple small object may become an incredibly dangerous, even deadly, projectile. Larger objects, as well, may cause the some results, wreaking havoc on life and property alike.

As such, various developments in shelter designs and materials have been undertaken throughout the last century or so. In the dustbowl region (Oklahoma, Kansas, for instance), the presence of storm cellars and other underground locations have been utilized as means to avoid severe thunderstorms and accompanying tornados. Generally, though, such cellars have a top cover that is not of great strength to withstand debris and other materials that may be tossed and projected by high speed winds. Further developments around the country have included the reliance on basements and even inner closets and rooms that are away from windows (due to the potential for glass break that may cause significant harm, as well as the exposure to outside debris that may transfer easily through such breakable barriers. Such protections are limited to the potential for preventing complete removal of the other portions of the subject home, certainly, and thus present a homeowner with quite limited protections as a result. Further devices have included building concrete rooms into the structure of a home, or even underneath a home, for a place to stay while a storm passes. The great cost and logistical difficulties with erecting such a concrete structure has led to the need to develop far easier and, preferably, lighter weight structures that allow for proper protection, and which may also provide greater reliability to a homeowner if and when such a structure is needed.

Thus, metal-based storm shelters have been developed as effective alternatives to the past concrete, etc., configurations and designs. Such metal-based shelters have proven, at least generally, to provide effective protection from wind speeds and projectile debris to a certain extent. Unfortunately, though, such past configurations have proven relatively difficult to erect, particularly to allow a homeowner the chance to select a proper size structure with any changes relatively easy to implement. As of today, the standard metal-based storm shelters require non-aligned top, side, and end panels with connections provided by length- and width-wise connecting components. Such connections provide the overall length and width limitations for such prior designs, effectively preventing any manner of potentially adding to the structure size, if desired. As well, the necessity to contact and connect all panels to single connection components is a rather cumbersome operation that creates undesirable difficulties to the homeowner once the choice to build such a structure is initiated. In essence, the prior metal-based structures, although some may be considered modular in design, all limit the versatility and pose certain problems to actually build. The aim of the industry is to provide easily erected, comfortable, potentially and easily modifiable, and, overall, extremely safe and reliable if an unfortunate severe weather front appears. To date, however, the storm shelter industry is extremely limited in terms of ease of manufacture as there are no discussions within the pertinent prior art of a storm shelter configuration that includes modular components that do not compromise strength upon connection together through the direct connection of all panels in alignment with one another, at least. Thus, there still exists a need to provide an easily manufactured and assembled storm shelter that provides the maximum level of protection for as long as a high wind event is present.

ADVANTAGES AND SUMMARY OF THE INVENTION

An advantage of the present invention is to provide a reliable storm shelter with an optimal number of interchangeable parts for ease in production and manufacture. Another advantage of the invention is the ability of the user to increase the size of the shelter through the addition of a modular component of same-size panels and connecting devices. Yet another advantage of this invention is the modular capability coupled with extremely strong and protective components that can withstand extremely high velocity winds and resultant projectile debris.

The inventive storm shelter provides the necessary levels of storm protection with the least level of work needed to erect such a structure within the industry. As well, the inventive method of erecting such a structure has yet to be undertaken within the storm shelter industry.

Accordingly, this invention encompasses an enclosed storm shelter made from high gauge steel components having two end walls, two side walls, and a roof, wherein one end wall includes a door frame, a reinforced door (and said door including multiple hinges and at least one vent) and two rectangular panels of differing dimensions, wherein each panel exhibits a top edge and a bottom edge and two parallel side edges when configured vertically as end wall components with said side edges longer than said top and bottom edges; wherein said two side walls include a number of rectangular panels having two long sides and two short sides vertically disposed such that the short sides of each panel provide a portion of the bottom edge and top edge of said storm shelter; wherein said roof includes the same number of rectangular panels and having substantially the same dimensions as the rectangular panels present in each of said two side walls, wherein said roof panels are horizontally disposed such that the edges of the short sides of said roof panels are aligned perpendicularly with each top edge short side of the panels present within said side walls; and wherein each of said short side edges of each roof panel is connected to each top edge short side of each side wall panels through a single and separate angled connector having a length substantially the same as that of both the edge of the short sides of said roof panels and the top edge short sides of said side wall panels.

More succinctly, this invention encompasses an enclosed storm shelter made from high gauge steel components having two end walls, two side walls, and a roof, wherein one end wall includes a door frame, a reinforced door (and said door including multiple hinges and at least one vent) and two rectangular panels of differing dimensions, wherein each panel exhibits a top edge and a bottom edge and two parallel side edges when configured vertically as end wall components with said side edges longer than said top and bottom edges; wherein said two side walls include a number of rectangular panels having two long sides and two short sides vertically disposed such that the short sides of each panel provide a portion of the bottom edge and top edge of said storm shelter;

wherein said other end wall includes a plurality of adjacent, parallel, rectangular panels that are configured vertically with each panel exhibiting parallel side edges and a top and bottom edge, wherein said top and bottom edges are shorter than said side edges;

wherein said two side walls are disposed perpendicularly to said end walls and include a plurality of adjacent, parallel, rectangular panels that are of substantially the same dimensions in terms of width, depth, length, and weight as the panels present within said other end wall and at least one panel within said door-included end wall, wherein said panels exhibit side edges and a top and bottom edge, wherein top and bottom edges are shorter in length than said side edges;

wherein said door frame is rectangular in shape and includes hinge means to permit said door to attach and open on demand, and wherein said frame includes a top edge, a bottom edge, and two parallel side edges that include periphery openings therein for connection means to be introduced for attachment of said frame to other components and external surfaces;

wherein said roof includes a plurality of adjacent, parallel, rectangular panels that are of substantially the same dimensions for the other panels within said side walls and other end wall, wherein said roof panels are configured horizontally with shorter edges substantially aligned and commensurate in length with the top edges of said panels of said side walls;

wherein each end wall and side panel includes a plurality of openings around its periphery to allow for connections therethrough, wherein each panel includes such openings at substantially the same distances around said periphery in order to permit connections with adjacent panels;

wherein said adjacent roof panels are connected together through connection means through said periphery openings;

wherein said adjacent side wall panels are connected together through connection means through said periphery openings;

wherein a plurality of horizontally disposed short-length angled connectors are present having openings for connections that are configured substantially the same as said openings within said roof, side wall, and end wall panel periphery openings and exhibiting the same length as the top edges and shorter edges of said side wall panels and roof panels such that each angled connector provides attachment between a single side wall panel top edge and a single roof panel shorter edge, such that each side wall panel is connected to a roof panel through an angled connector;

wherein four vertically disposed angled connectors are present having openings for connections that are configured substantially the same as said openings within said side wall and end wall periphery openings and exhibiting the same length as the side edges of said side wall panels and end wall panels such that each vertically disposed angled connector provides attachment between a single side wall panel side edge and a single end wall panel side edge, such that each vertically disposed angled connector provides a corner of said storm shelter;

wherein said door-including wall panel of dissimilar dimensions to said other panel at least exhibits the same vertical length as said other panel, and further includes two parallel side edges equal to said vertical length of said other panel and a top edge and a bottom edge that is shorter in length than said side edges;

wherein said roof panels are attached to said end wall panels and said door frame through connection means introduced within openings within at least one angled connector, wherein said openings are aligned with the periphery openings of said roof panels, said end wall panels, and said door frame;

wherein said door-including wall panels are connected with said door frame through connection means introduced through said periphery openings therein; and wherein said panels within all of said end walls and said side walls are attached to a solid surface through connection means introduced through said periphery openings therein.

The invention further includes a method of erecting a storm shelter as described above comprising the steps of:

a) providing i) a plurality of rectangular panels having substantially similar dimensions in terms of length, width, depth, and weight and including periphery openings of substantially similar placement and size, said panels exhibiting two parallel shorter edges and two parallel longer edges;

ii) a plurality of angled connectors having substantially the same length as the shorter edges of said plurality of rectangular panels and openings disposed in alignment with the openings present along the periphery of the shorter edges of said panels;

iii) a plurality of connecting bolts aligned with the size of said periphery openings of said panels and said connectors;

b) connecting three rectangular panels together into a U-shaped structure through the connection of a first panel to a second at a substantially perpendicular angle through the utilization of one of said angled connectors and a plurality of said connecting bolts such that said connection is present at the shorter edges of said two panels and then connecting another rectangular panel to one of previously connected panels through the same manner, wherein at least two of said three-membered U-shaped structures are to be constructed through this procedure to create a multiple three-membered U-shaped structure having two parallel closed sides and two parallel open sides and a covered top side;

c) providing: i) another plurality of rectangular panels having substantially similar dimensions in terms of length, width, depth, and weight and including periphery openings of substantially similar placement and size, said panels exhibiting two parallel shorter edges and two parallel longer edges, such that said plurality of panels has substantially the same dimensions as those in step a)i), above;

ii) providing a rectangular door frame having a top and a bottom edge and two parallel side edges, as well as hinge means to allow for placement and swinging movement of a door, wherein said frame includes periphery openings of substantially similar placement and size;

iii) providing a single panel of substantially similar length and disposition as the panels in sub-step i), above, and having a width shorter than said panels in sub-step i), above, wherein said single panel exhibits a top and bottom edge and two parallel side edges, and includes periphery openings of substantially similar placement and size;

iv) providing four angled connectors having substantially the same length as the side edges of said plurality of rectangular panels of a)i), above, and openings disposed in alignment with the openings present along the periphery of the longer edges of said same panels;

v) providing a separate angled connector of the length of the top edges of said door frame and said single panel having openings disposed in alignment with the openings present along the periphery of the longer edges of said rectangular panels of a)i), above, and said door frame and said single panel; and vi) a plurality of connecting bolts aligned with the size of said periphery openings of said plurality of rectangular panels, said door frame, said single panel, and said angled connectors;

d) connecting i) said multiple U-shaped structure of step b), above, with said panels of c)i), above, through connecting three rectangular panels in vertical alignment with one parallel open side of said U-shaped structure through the lengthwise connection of two outer panels perpendicularly to one of the vertically disposed panels of said U-shaped structure through the utilization of two of said four angled connectors of step c) iv), above, and a plurality of said connecting bolts of step c)vi), above, such that said connection is present at the side edges of said panels, and then attaching a third middle panel to the two outer connected panels through the utilization of connecting bolts through the periphery openings of the three panels, and further attaching the top edge of said outer and middle panels to the panel comprising the top edge of said U-shaped member through three adjacent angled connectors as provided in step a)ii) and utilizing connecting bolts to provide a connected panel to said U-shaped member, thus creating a closed end configuration for said U-shaped member;

ii) attaching another panel as from step c)i) to the remaining side panel adjacent to the open end of said U-shaped member through one of the angled connectors from step c)iv), above, through the utilization of connecting bolts through aligned periphery openings present within both panels, and also connecting said panel to a portion of the panel comprising the top of said U-shaped member through an angled connector utilizing connecting bolts to create a connected panel to said closed end U-shaped member;

iii) attaching said door frame from step c)ii), above, to said further connected panel through introduction of connecting bolts through aligned periphery openings present within both said panel and said door frame, and also connecting said door frame to said U-shaped member through said angled connector of step c)v) with connecting bolts, creating a nearly closed U-shaped member; and iv) attaching said single panel of step c)vi) to all of said vertically disposed edge of said U-shaped member, said door frame, and said top edge of said U-shaped member, through the utilization of connecting bolts between said panel and said door frame, and said angled connector of step c)v), above;

e) attaching a latchable door to said door frame; and f) and connecting said shelter to a solid surface through the utilization of connecting bolts through said periphery openings along the bottom edges of each component panel and said door frame.

Such a shelter and method of constructing thereof provides a highly efficient manufacturing process for a user, particularly at his or her own place of residence, while simultaneously providing extremely high levels of protection. The capability of initially constructing U-shaped members of side and roof panels individually permits the user not only ease in construction, but, potentially more importantly, a modular configuration that allows for add-ons and size increases on demand. Rather having to take down a roof portion or other components that are cumbersome generally to move (as opposed to end panels that can be easily removed and replaced), the user has the capability of simply adding another U-shaped member to the overall design to increase the living area internally, without compromising any strength or protective benefits.

As well, the utilization of a plurality of substantially similar panels for roof, sidewall, and end wall purposes creates a much simpler manner of manufacturing component parts from a factory perspective. Likewise, the utilization of many similarly structured angled connectors, with four vertically disposed types and another single connector (potentially) of differing size, allows for greater efficiency overall for the original manufacturer as well as the erector. Furthermore, if a part is lost or damaged, replacement thereof is made far simpler through such an overall design.

Prior storm shelter designs have not reflected any consideration of the benefits accorded the industry through the development described herein. In particular, although modular concepts and similar panel structures have been contemplated in the past, the main concern with such shelters pertained to protection with a minimal increase in efficiency during the manufacturing and construction stage. Small and thin panels have been utilized with a large number of necessary connections to provide the complete construction (which consequently leads to an increase in the number of potential weak spots for compromise of the overall structure). Additionally, prior storm shelters, particularly met-based ones, have relied upon individual panel connections through connection devices that run the length of an entire wall. Although vertically disposed connection devices are prevalent as well with such lengthwise configurations, the horizontally disposed types are apparently more important for the purpose of reliably retaining wall strength and provider a barrier to high winds that may create a force that could, theoretically, loosen or, at worst, undo connecting bolts that are exposed to such extremes. As such, the utilization of individual angled connecting devices is rather counterintuitive to the state of the storm shelter art.

As it is, the inventive shelters have been realized not only as extremely effective and incredibly protective to high wind events and projectile debris, but the utilization of individual angled connecters (as described herein, such a term is intended to reflect a properly angled metal post with connecting bolt or other connecting means openings present therein; with a 90 degree bend therein, such angled connectors allow for strong and effective bolt connections between perpendicularly disposed panel ends in order to create a right angled structure between such panel components), rather than angled or other connectors that run the length of a wall or roof, and thus contact each or multiple roof panels and wall panels simultaneously, has been greatly unexpected. As a result, however, not only is there no loss in overall strength and thus capability of withstand high winds (up to 250 MPH, at least), but it was realized that a true and highly effective modular design for storm shelters was now possible. By utilizing such individual connections and connectors between roof and wall panels, and particularly along short edges of substantially similar lengths for both, a user may create a ribbed structure that is also modular in configuration. Thus, with two wall panels connected to a single roof panel, the user may generate a U-shaped composite of three panels and two connectors (in use, the U would be inverted, of course). Upon production of multiple U-shaped composites (or members), with three panels and two connectors apiece, a user may then easily provide extensions to the overall size of the desired subject storm shelter on demand. With a roof already in place, and two side walls also provided upon the connection of the constituent panels of such U-shaped members together (and connected lengthwise in adjacent fashion, thereby providing extended rib designs as more U-shaped members are connected together in like fashion), a user would then merely need to attach end panels to form an end wall and then a proper configuration including a door frame, a door, and proper panels to the other end to create the desired enclosure. With proper connecting bolts or other connecting means in place, and the ability to connect the structure to a solid surface (such as, for instance, set concrete), through bolt openings around the bottom edge peripheral edges of the overall structure (as described herein, the panels and door frame all include proper bolt openings, at least, for such a purpose).

The resultant storm shelter thus can include a door with a vent, or a vent provided in an of the panels within the structure (for simplicity sake and manufacturing purposes, a potentially preferred design would limit the presence of a vent on the door for uniformity at the manufacturing level; singling out one type of panel for such an added component may be undertaken, but it may also add complexity to the overall construction method). In particular, the one panel that is dissimilar from the others, within the potentially preferred embodiment of this invention, may include a vent if desired for simplicity in manufacturing, as long as such a vent does not compromise the overall strength and protective nature of such a dissimilar panel. Additionally, the shelter may include any type of effective lock, latch, or other type of mechanism to ensure the door will not open during a high wind event. The door also preferably includes strong welded hinges that utilizes high gauge steel bolts for connection to the structure as well as capability of allowing the door to swing open and closed as needed. A triple or double lock device is potentially preferred that includes at least two high gauge steel rods that are vertically disposed and maneuverable in relation to a rotating latch. One rod would be disposed to move upward to latch in some manner along the door frame or through a properly aligned nut within the overall structure; another rod would then move downward in the same manner. Such door, vent, and locking mechanism could be provided already installed or it may be supplied disengaged and requiring of assembly. In any event, the overall structure and method of erecting such a shelter is relatively easy to undertake, even with such mechanical devices present.

BRIEF DESCRIPTION OF THE DRAWINGS

FIG. 10 is a front view of a potentially preferred U-shaped modular member of the inventive storm shelter.

FIG. 10A is a side view of the member of FIG. 10.

FIG. 10B is a side view of two of the members of FIG. 10 connected together.

FIG. 11 is a front view of a potentially preferred closed U-shaped member having an end wall erected to FIG. 10B.

FIG. 11A is a side view of the structure of FIG. 11.

DETAILED DESCRIPTION OF THE DRAWINGS AND THE PREFERRED EMBODIMENTS

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

Figure 1:
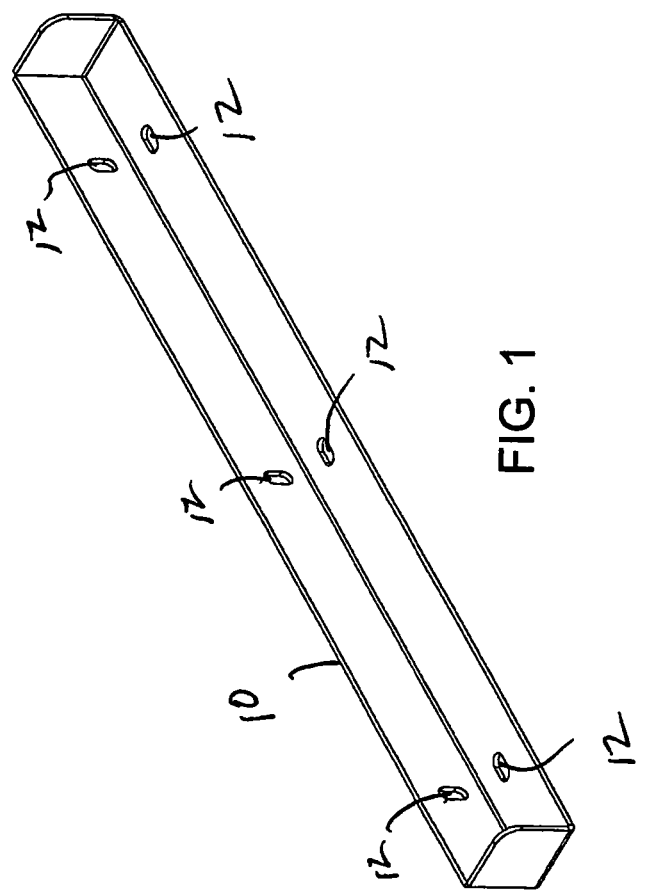
FIG. 1 is a side representation of a potentially preferred short-length angled connector for roof panel connection to side and end wall panels.
Figure 2:
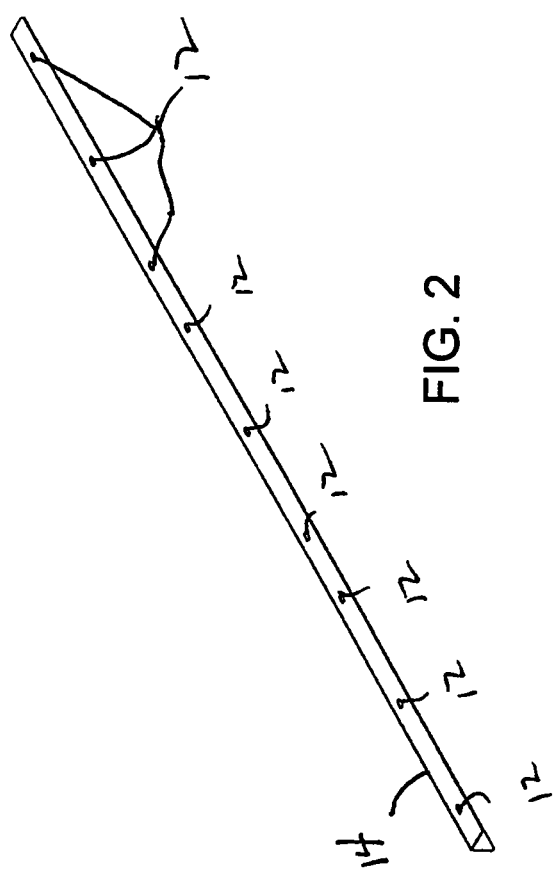
FIG. 2 is a side representation of a potentially preferred vertically disposed angled connector for connections between side wall panels and end wall panels.
Figure 3:
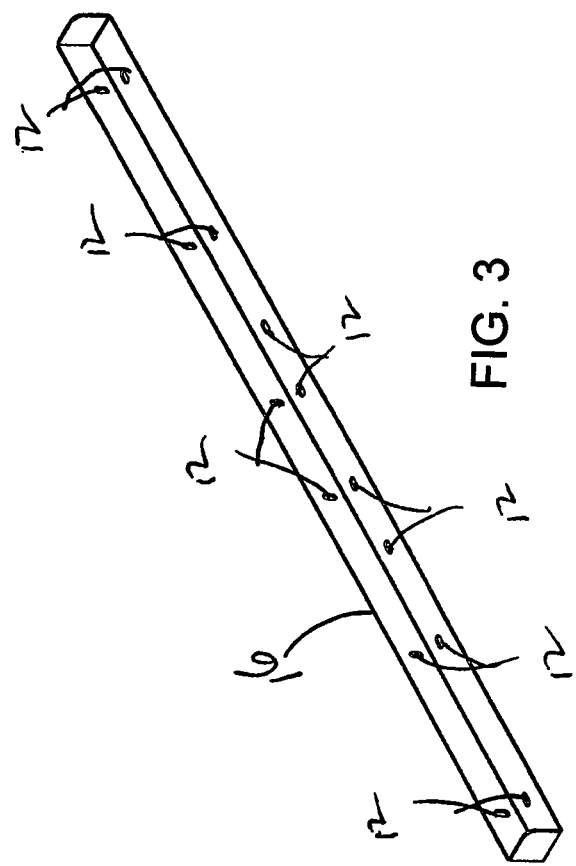
FIG. 3 is a side representation of a potentially preferred angled connector for roof panel connection to a door frame and a single end wall panel.
Figure 9:
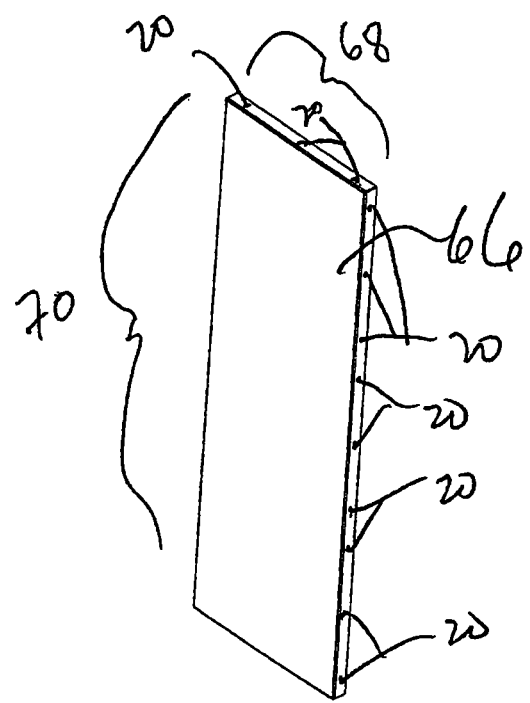
FIG. 9 is a side representation of a potentially preferred individual wall panel that utilized for the entirety of the shelter roof, side walls, and closed end wall, as well as a single panel adjacent to the door.

FIGS. 1, 2, and 3 show the three different angled connectors that are utilized in one potentially preferred embodiment of this invention. FIG. 1 shows a short-length angled connector 10 that includes proper connecting openings 12 on opposing edges that are spaced and sized appropriately to allow alignment with openings within panels (such as shown in FIG. 9). The term "short-length" is intended to indicate that such a connector is utilized to connect short edges of roof and side wall panels (as in FIG. 9, and connections shown, for example, in FIGS. 10, 10A, and 10B). The potentially preferred length of this angled connector is roughly 26 inches (about 66 centimeters), with the angle roughly 90 degrees. The openings 12 are spaced roughly 3 inches from each end with 10 inches between each opening 12. Depending on the number of U-shaped member modules (as in FIGS. 10, 10A, and 10B) utilized for shelter construction, at least 8 such connectors and up to the number of modules plus 6 would be present for individual connections between roof panels and side wall panels, as well as between the long portions of roof panels and end wall panels, the door frame, and the dissimilar panel.

Figure 12:
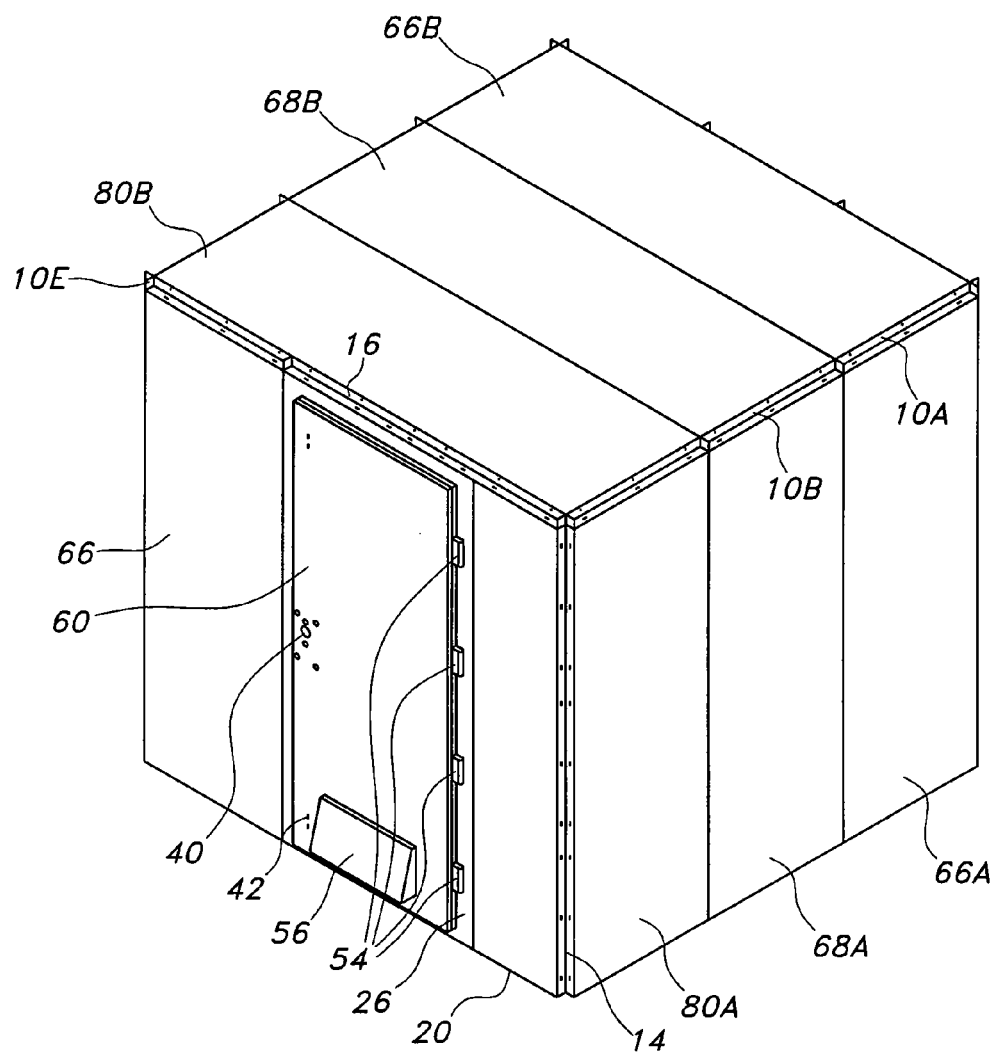
FIG. 12 is a side view of one potentially preferred embodiment of a constructed inventive storm shelter.

In FIG. 2, a vertically disposed connector 14 is shown. The term "vertically disposed" indicates that such a connector provides connections lengthwise between side wall panels and end wall panels (as shown in FIG. 12). Four such connectors 14 are present within each shelter that may be made in accordance with the inventive design and method, providing the corners of the four-sided structures. Openings 12 for bolt connections are provided for such connections to occur; in this potentially preferred embodiment, such openings are also 3 inches from the bottom and top edges thereof and are spaced 10 inches apart between the top three openings and bottom three openings, with a six inch gap thereafter for each set and another opening present 10 inches from those two. As with the short-length connector (10 of FIG. 1), this connector 14 includes a 90 degree angle for opposing openings 12 for proper perpendicular connections between subject panels.

FIG. 3 provides a single connector 16 present within a potentially preferred embodiment of this invention. This single connector 16 is present between a portion of the long sides of roof panels and the top edges of the dissimilar panel (FIG. 4) and the door frame (FIG. 5). As with the connectors above (FIGS. 1 and 2), openings 12 are present that are opposite one another at a 90 degree angle for allow for proper connection between such panels and the frame. The openings are spaced and sized as above, with 3 inch spaces between the ends and first openings, two 10 inch gaps between the first two sets of openings, and a 6 inch gap in between. Additionally, one end includes an extra opening on either side that is located about 3 inches from the two center openings.

Figure 4:
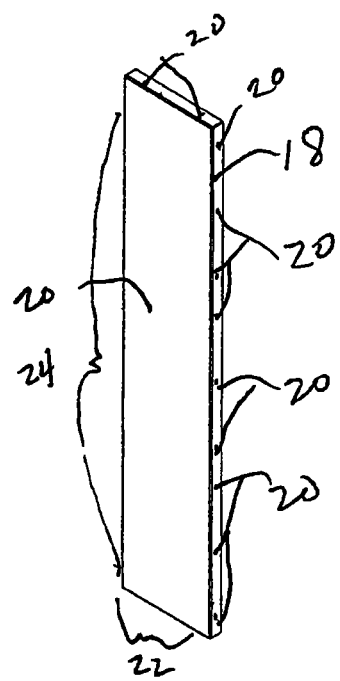
FIG. 4 is a side representation of a potentially preferred individual wall panel that is adjacent to a door frame and dissimilar from all other panels within the storm shelter structure.
Figure 5:
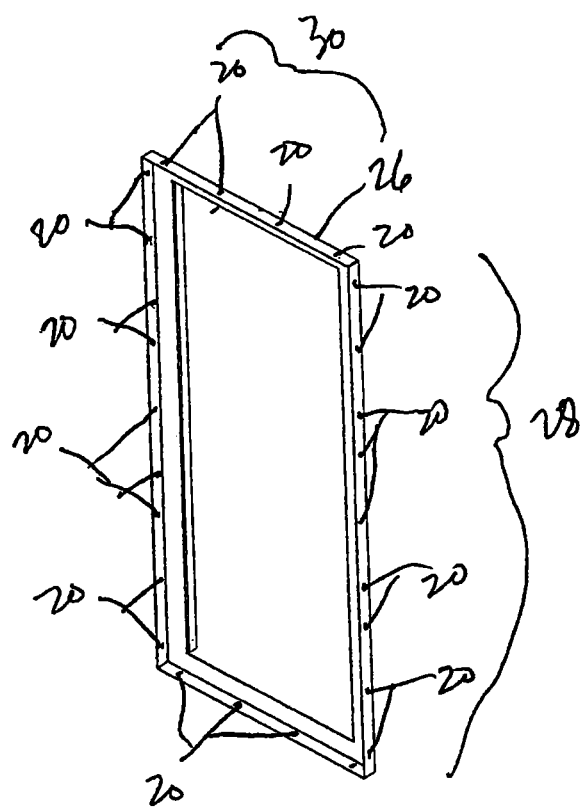
FIG. 5 is a side representation of a potentially preferred door frame.

FIG. 4 shows the single dissimilar panel 18 that is placed adjacent to the door frame (FIG. 5) on the potentially preferred storm shelter structure (FIG. 12). The term "dissimilar" indicates that this single panel does not conform to the dimensions of all of the other panels (FIG. 9) present on the structure. In this embodiment, the dissimilar panel 18 measures 16 inches by 78 inches, and includes multiple openings 20 along the peripheral edges thereof. On the top edge and bottom edge 22, collectively, two openings 20 are present that are 3 inches from each side edge and 10 inches from one another. The side edges 24 include multiple openings 20 that are 10 inches apart with the outer two 3 inches from the top and bottom edges 22, respectively. The panel 18 has a depth of roughly 2 inches, as well.

Figure 6:
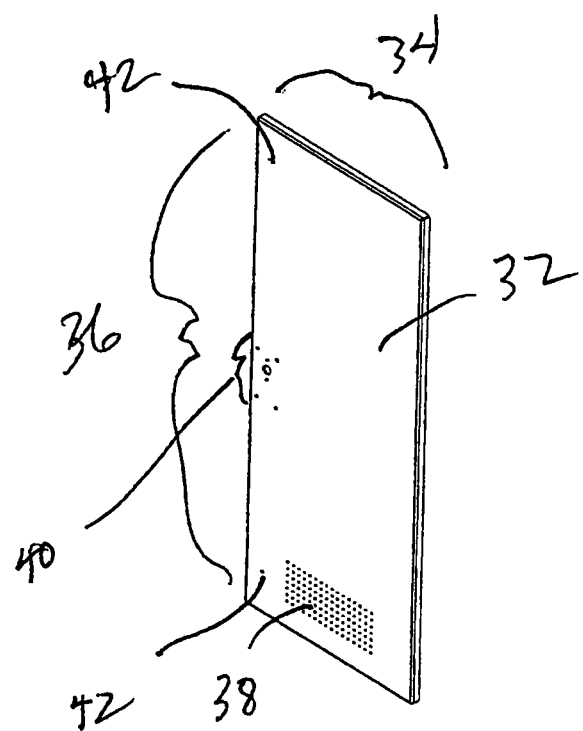
FIG. 6 is a side external representation of a potentially preferred door.

FIG. 5 depicts a door frame 26 for placement adjacent to the dissimilar panel (FIG. 4). The height is 78 inches (like the dissimilar panel) and the width is 36 inches (depth of roughly 2 inches), allowing for a 30 inch door to be introduced therein (FIG. 6, for instance). Such a frame includes openings 20 along the top and bottom edges 30, collectively, and the side edges 28, aligned with the same 3 inch extension from the edges and 10 inch spacings therebetween.

Figure 7:
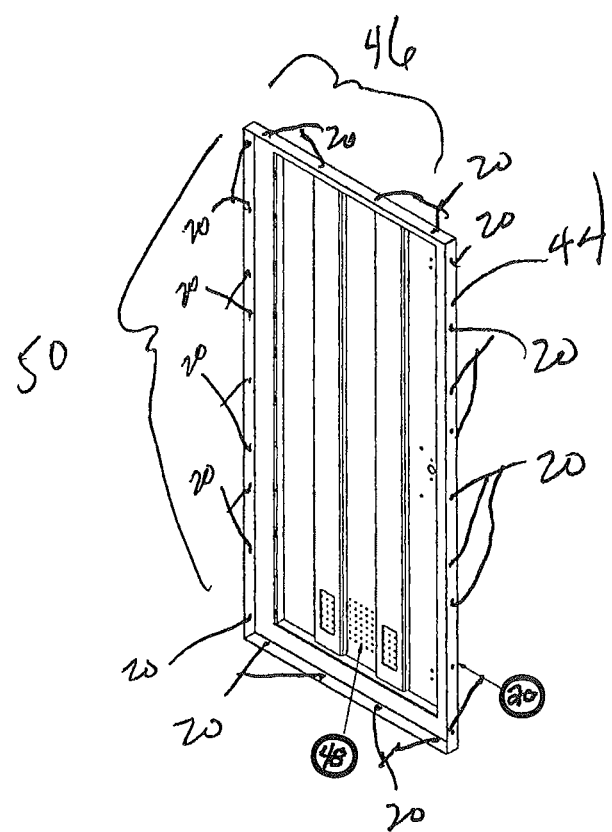
FIG. 7 is a side internal representation of a potentially preferred door.
Figure 8:
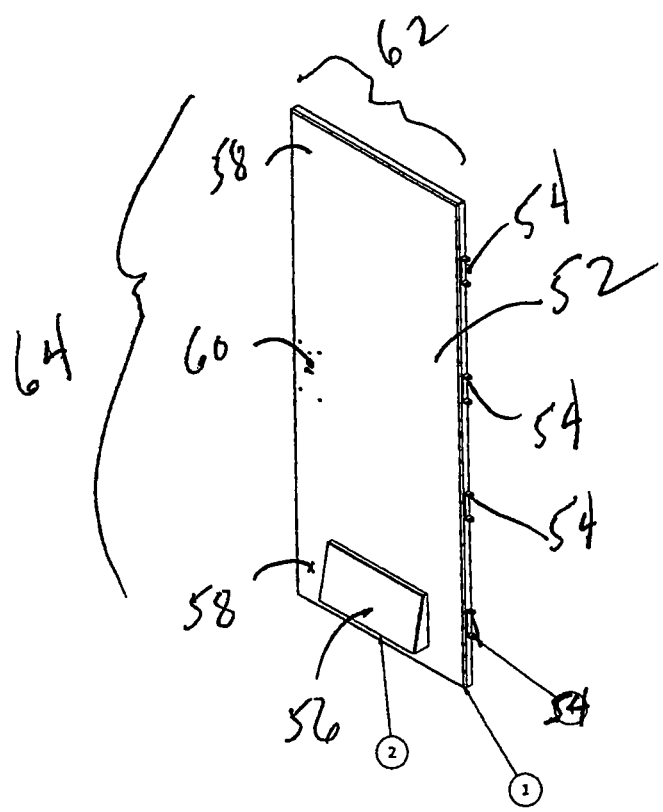
FIG. 8 is a side external representation of a potentially preferred door weldment for attachment and reinforcement of the door of FIG. 6.

On portion of the door 32 is shown in FIG. 6, with a reinforcement provided in FIG. 8 for placement externally to this component 32. Such a door is roughly 30 inches in width (top and bottom edges 34) and 74 inches in height (sides 36) to fit flush and snugly within the door frame of FIG. 5. A vent 38 is provided for air entry upon enclosure within the finished shelter (FIG. 12). Additionally, proper holes 40 are provided for attachment of a lock mechanism. The other side of such a door when attached to the door frame 44 is provided in FIG. 7. A vent 48 is provided, again, as well as multiple openings as described for FIG. 5, above. The top and bottom edge 46 and side edges 50 thus fit as described in FIG. 5, as well. External to the door is thus a reinforcement 52, as shown in FIG. 8. Hinges 54 and provided to strongly attach to the structure and allow for the door to swing open and closed as necessary. A vent cover 56 is provided, as well as, again, locking mechanism holes 60. Holes 58 for rod openings in relation to a lacking mechanism is also provided. The top and bottom edges 62 are roughly 30 inches long and the side edges 64 provide a height of about 74 inches, as well.

The roof, side wall, and most of the end wall panels are depicted with the single panel 66 of FIG. 9. This component is 78 inches in height, roughly, at its sides 70, and roughly 26 inches wide at its top and bottom edges 68. As with the other panel, openings 20 are included for connection purposes. The depth is roughly 2 inches and, as with the other panel and the door frame, allows, for the presence of such openings 20 along its periphery for connections between other panels, the door frame, and the other panel, as well as a solid surface. As with the openings described above, such connections are undertaken through proper connecting means, such as Grade 8 hardness bolts, washers, and screws, as one non-limiting example. As well, the panel 66 is preferably, though not necessarily, constructed from 10 Gauge steel and C-channel designs (to allow for the openings 20 and thus connections to occur on demand). The openings 20 are, as above, 3 inches from each edge, with 10 inches in between the top three and bottom three openings, a 6 inch gap between the next openings from top and bottom, and two more 10 inch gaps between the center openings.

FIGS. 10 and 10A thus provides one potentially preferred embodiment of the important modular U-shaped component 70 of this invention. Three panels 66A, 66B, 66C are connected perpendicularly to one another via two individual short-length angled connectors 10 to provide the U-shaped member 70. In FIG. 10B, a dual U-shaped member 72 is provided through the connection of the first (70 from FIG. 10A) to another with its own three panels 68A, 68B, 68C connected via two short-length angled connectors 10A. To connect these, connecting bolts (not illustrated) are utilized to connect through the openings within each panel (20 in FIG. 9, for instance), rather than connecting anything further to the short-length angled connectors 10, 10A. A user may connect any number of U-shaped members together in this fashion, depending on the overall size of the finished shelter (FIG. 12, for instance). As such, this modular capability provides the facilitation for construction with excellent performance under high velocity winds that is highly unexpected. FIG. 11A shows the addition of end wall panels 72A, 72B, 72C to the FIG. 10B structure utilizing short-length angled connectors 10B, 10C, 10D, with connection between outer end wall panels 72Am 72C to side wall panels 66A (66C in FIG. 10B), through the utilization of vertically disposed angled connectors 14. Thus, connecting bolts may be utilized for each opening 20 (FIG. 9, for instance) to create the structure in this manner.

FIG. 12 thus shows the addition of the last end wall panel 66, the door frame 26, the door 60, with attached hinges 54, a vent cover 56, and holes for a locking mechanism 40 and rod openings 42, as well as the dissimilar panel 20, all attached via connecting means to one another and with a short-length angled connector 10E to connect the end wall panel 66 to the roof panel 80B, and a vertically disposed angled connector 14 allowing for connection between the dissimilar panel 20 and another side wall panel 80A. The finished enclosure can thus be connected to a solid surface (not illustrated) through the periphery openings (20 in FIG. 9, for instance) and proper connection means, such as, again, connecting bolts, introduced therein. Upon closing and locking the door, such a shelter can withstand forces at least up to 250 MPH in wind speeds, thereby providing not only a highly effective protective structure, but, with the modular components present and utilized herein, one that is relatively easy to construct and to manufacture.

As noted above, a user may utilize any number of U-shaped member modules to increase the size of the desired shelter without the need to remove or tear down any portion thereof. Simply disengaging the connecting bolts between a solid surface and the exterior U-shaped member module (with an end wall applied) and inserting one or more U-shaped module members in between will suffice for such a purpose.

It will be understood that various changes in the details, materials, and arrangements of the parts which have been described and illustrated herein in order to explain the nature of this invention may be made by those skilled in the art without departing from the principles and scope of the invention as expressed in the following claims.

I claim:

1. An enclosed storm shelter made from steel components having two end walls, two side walls, and a roof, wherein one end wall includes a door frame, a reinforced door, and two rectangular panels of differing dimensions, wherein each panel exhibits a top edge and a bottom edge and two parallel side edges when configured vertically as end wall components with said side edges longer than said top and bottom edges; wherein said two side walls include a number of rectangular panels having two long sides and two short sides vertically disposed such that the short sides of each panel provide a portion of the bottom edge and top edge of said storm shelter; wherein said roof includes the same number of rectangular panels and having substantially the same dimensions as the rectangular panels present in each of said two side walls, wherein said roof panels are horizontally disposed such that the edges of the short sides of said roof panels are aligned perpendicularly with each top edge short side of the panels present within said side walls; and wherein each of said short side edges of each roof panel is connected to each top edge short side edge of each side wall panel through a single angled connector having a length substantially the same as that of both the edge of each short side of each roof panel and the top edge of each short side of each side wall panel; wherein said storm shelter is provided in modular form in relation to each set of side wall and roof panels connected to said single angled connectors.

2. The storm shelter of claim 1 wherein said plurality of panels are C-channel steel.

3. The storm shelter of claim 1 wherein said steel is 10 gauge steel.

4. The storm shelter of claim 1 wherein said steel components are powder coated.

5. The storm shelter of claim 2 wherein said plurality of panels are about 26 inches wide by 78 inches long.

6. An enclosed storm shelter made from steel components having two end walls, two side walls, and a roof, wherein one end wall includes a door frame, a door and two rectangular panels of differing dimensions, wherein each panel exhibits a top edge and a bottom edge and two parallel side edges when configured vertically as end wall components with said side edges longer than said top and bottom edges;

wherein said other end wall includes a plurality of adjacent, parallel, rectangular panels that are configured vertically with each panel exhibiting parallel side edges and a top and bottom edge, wherein said top and bottom edges are shorter than said side edges;

wherein said two side walls are disposed perpendicularly to said end walls and include a plurality of adjacent, parallel, rectangular panels that are of substantially the same dimensions in terms of width, depth, length, and weight as the panels present within said other end wall and at least one panel within said door-included end wall, wherein said panels exhibit side edges and a top and bottom edge, wherein top and bottom edges are shorter in length than said side edges;

wherein said door frame is rectangular in shape and includes lock and hinge means to permit said door to lock and open on demand, and wherein said frame includes a top edge, a bottom edge, and two parallel side edges that include periphery openings therein for connection means to be introduced for attachment of said frame to other components and external surfaces;

wherein said roof includes a plurality of adjacent, parallel, rectangular panels that are of substantially the same dimensions for the other panels within said side walls and other end wall, wherein said roof panels are configured horizontally with shorter edges substantially aligned and commensurate in length with the top edges of said panels of said side walls;

wherein each end wall and side panel includes a plurality of openings around its periphery to allow for connections therethrough, wherein each panel includes such openings at substantially the same distances around said periphery in order to permit connections with adjacent panels;

wherein said adjacent roof panels are connected together through connection means through said periphery openings;

wherein said adjacent side wall panels are connected together through connection means through said periphery openings;

wherein a plurality of horizontally disposed short-length angled connectors are present having openings for connections that are configured substantially the same as said openings within said roof, side wall, and end wall periphery openings and exhibiting the same length as the top edges and shorter edges of said side wall panels and roof panels such that each angled connector provides attachment between a single side wall panel top edge and a single roof panel shorter edge, such that each side wall panel is connected to a roof panel through a single angled connector, and wherein each such connection provides a modular configuration for the overall shelter;

wherein four vertically disposed angled connectors are present having openings for connections that are configured substantially the same as said openings within said side wall and end wall periphery openings and exhibiting the same length as the side edges of said side wall panels and end wall panels such that each vertically disposed angled connector provides attachment between a single side wall panel side edge and a single end wall panel side edge, such that each vertically disposed angled connector provides a corner of said storm shelter;

wherein said door-including wall panel of dissimilar dimensions to said other panel at least exhibits the same vertical length as said other panel, and further includes two parallel side edges equal to said vertical length of said other panel and a top edge and a bottom edge that is shorter in length than said side edges;

wherein said roof panels are attached to said end wall panels and said door frame through connection means introduced within openings within at least one angled connector, wherein said openings are aligned with the periphery openings of said roof panels, said end wall panels, and said door frame;

wherein said door-including wall panels are connected with said door frame through connection means introduced through said periphery openings therein; and wherein said panels within all of said end walls and said side walls are attached to a solid surface through connection means introduced through said periphery openings therein.

7. The storm shelter of claim 6 wherein said plurality of panels are C-channel steel.

8. The storm shelter of claim 6 wherein said steel is 10 gauge steel.

9. The storm shelter of claim 6 wherein said steel components are powder coated.

10. The storm shelter of claim 6 wherein said door is of reinforced steel construction and includes multiple hinges, a locking mechanism, and a vent.

11. The storm shelter of claim 7 wherein said plurality of panels are about 26 inches wide by 78 inches long.

\* \* \* \* \*